United States Patent
Han et al.

(10) Patent No.: US 11,055,733 B2
(45) Date of Patent: Jul. 6, 2021

(54) SALES PROMOTION METHOD, APPARATUS AND ELECTRONIC DEVICE

(71) Applicant: Advanced New Technologies Co., Ltd., Grand Cayman (KY)

(72) Inventors: Zhe Han, Hangzhou (CN); Lei Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/082,538

(22) Filed: Oct. 28, 2020

(65) Prior Publication Data

US 2021/0042779 A1    Feb. 11, 2021

Related U.S. Application Data

(63) Continuation of application No. PCT/CN2019/096074, filed on Jul. 16, 2019.

(30) Foreign Application Priority Data

Aug. 27, 2018  (CN) .......................... 201810983534.9

(51) Int. Cl.
  *G06Q 30/02*  (2012.01)
  *H04W 12/63*  (2021.01)
  (Continued)

(52) U.S. Cl.
  CPC ........ *G06Q 30/0225* (2013.01); *H04W 4/022* (2013.01); *H04W 4/06* (2013.01);
  (Continued)

(58) Field of Classification Search
  CPC ............. G06Q 30/0225; H04W 4/022; H04W 12/1202; H04W 4/06; H04W 12/1008; H04W 12/00512; H04W 12/00503

See application file for complete search history.

(56) References Cited

U.S. PATENT DOCUMENTS

2004/0162059 A1    8/2004  Hiltunen
2008/0285495 A1*  11/2008  Wentink ................ H04W 12/02
                                                                  370/311
(Continued)

FOREIGN PATENT DOCUMENTS

CN           100433114           11/2008
CN           103179520            6/2013
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Chuong A Ngo
(74) *Attorney, Agent, or Firm* — Fish & Richardson P.C.

(57) ABSTRACT

Disclosed herein are methods, systems, and apparatus, including computer programs encoded on computer storage media, for data broadcasting. One of the methods includes: receiving a wakeup message broadcast by a broadcast device in a predetermined range, wherein the wakeup message is configured to waking up a corresponding application installed on a terminal device from a sleep mode; receiving encrypted marketing message from the broadcast device, wherein the encrypted marketing message comprises merchant information and promotional information corresponding to the merchant information; determining that the encrypted marketing message belongs to a predetermined category; sending the encrypted marketing message to a server for verifying authenticity of the encrypted marketing message; and receiving the merchant information and the promotional information from the server when the authenticity of the encrypted marketing message is successfully verified.

21 Claims, 9 Drawing Sheets

(51) Int. Cl.
*H04W 12/108* (2021.01)
*H04W 12/71* (2021.01)
*H04W 12/122* (2021.01)
*H04W 4/021* (2018.01)
*H04W 4/06* (2009.01)

(52) U.S. Cl.
CPC ....... *H04W 12/108* (2021.01); *H04W 12/122* (2021.01); *H04W 12/63* (2021.01); *H04W 12/71* (2021.01)

(56) References Cited

U.S. PATENT DOCUMENTS

| | | |
|---|---|---|
| 2014/0304734 A1 | 10/2014 | Cohen |
| 2015/0186887 A1* | 7/2015 | Khan ................ G06Q 20/223 705/71 |
| 2015/0278873 A1 | 10/2015 | Sylvester |
| 2016/0283979 A1 | 9/2016 | Chatterton |

FOREIGN PATENT DOCUMENTS

| | | |
|---|---|---|
| CN | 103796151 | 3/2014 |
| CN | 104428806 | 3/2015 |
| CN | 104506416 | 4/2015 |
| CN | 104766227 | 7/2015 |
| CN | 105431873 | 3/2016 |
| CN | 105557031 | 5/2016 |
| CN | 105786548 | 7/2016 |
| CN | 206226635 | 6/2017 |
| CN | 107230089 | 10/2017 |
| CN | 107770852 | 3/2018 |
| CN | 108076145 | 5/2018 |
| CN | 108418806 | 8/2018 |
| CN | 109255653 | 1/2019 |
| TW | I415924 | 11/2013 |
| WO | WO 2015102790 | 5/2015 |

OTHER PUBLICATIONS

International Search Report and Written Opinion in International Application No. PCT/CN2019/096074, dated Sep. 27, 2019 (partial English Translation), 10 pages.
Nakamoto, "Bitcoin: A Peer-to-Peer Electronic Cash System," www.bitcoin.org, 2005, 9 pages.

* cited by examiner

SALES PROMOTION METHOD, APPARATUS AND ELECTRONIC DEVICE

CROSS-REFERENCE TO RELATED APPLICATIONS

This application is a continuation of PCT Application No. PCT/CN2019/096074, filed on Jul. 16, 2019, which claims priority to Chinese Patent Application No. 201810983534.9, filed on Aug. 27, 2018, and each application is hereby incorporated by reference in its entirety.

TECHNICAL FIELD

The present application relates to the field of computer technologies, and in particular, to sales promotion methods, apparatuses and electronic devices.

BACKGROUND

To promote consumer consumption and improve competition, many brick and mortar stores and large-scale shopping malls launch some promotions to attract more consumers to consume. In addition, when going to the brick and mortar stores or the large-scale shopping malls to purchase goods, the consumers often pay more attention to whether the brick and mortar stores or the large-scale shopping malls have promotions.

Currently, the consumer usually has two methods to determine a promotion of a merchant or a shopping mall. In a first method, to help the consumer to determine a promotion of a brick and mortar store or a shopping mall in time, many branded stores or large shopping malls usually send latest promotions to members of these branded stores or large shopping malls by using short messages or messages of subscribed accounts. In a second method, the consumer can also determine a latest promotion of a store or a shopping mall by asking a clerk or through an offline promotion activity of the store or the shopping mall.

However, in the first method, only a consumer who has registered as member in the brick and mortar store or the shopping mall can receive messages about the promotions. In addition, if the consumer has registered as member of a plurality of merchants or shopping malls, the consumer possibly receives messages about promotions of a plurality of merchants or shopping malls in a same period of time (for example, Christmas or New Year's Day). As a result, the consumer confuses promotions of different merchants or shopping malls. In the second method, the customer needs to ask the clerk personally or see the offline marketing activity of the shopping mall to determine the latest discount activity.

SUMMARY

Embodiments of the present application provide sales promotion methods and apparatuses and electronic devices, to alleviate a problem in the existing technology that a method that a consumer determines a latest promotion of a merchant or a shopping mall is not optimized enough.

To alleviate the previous technical problem, the embodiments of the present application are implemented as follows:

A first aspect provides a sales promotion method, including: receiving, by a terminal device, a wakeup message broadcast by a signal broadcast device in a predetermined range, where the wakeup message is used to wake up a specified application in the terminal device when the specified application is in a disabled state; receiving, by the terminal device, encrypted marketing information broadcast by the signal broadcast device in the predetermined range, where the encrypted marketing message includes merchant information and marketing activity information corresponding to the merchant information; sending, by the terminal device, the encrypted marketing message to a marketing message verification apparatus for verification if the terminal device determines that a category of the encrypted marketing message is a predetermined category; and sending, by the marketing message verification apparatus, the merchant information and the marketing activity information corresponding to the merchant information that are in the encrypted marketing message to the terminal device if verification of the encrypted marketing message by the marketing message verification apparatus succeeds.

A second aspect provides a sales promotion system, including: a signal broadcast device, configured to: broadcast a wakeup message in a predetermined range, where the wakeup message is used to wake up a specified application in a terminal device when the specified application is in a disabled state; and broadcast encrypted marketing information in the predetermined range; a terminal device, configured to receive the wakeup message broadcast by the signal broadcast device in the predetermined range, where the wakeup message is used to wake up the specified application in the terminal device when the specified application is in a disabled state; receive the encrypted marketing information broadcast by the signal broadcast device in the predetermined range, where the encrypted marketing message includes merchant information and marketing activity information corresponding to the merchant information; and send the encrypted marketing message to a marketing message verification apparatus for verification if the terminal device determines that a category of the encrypted marketing message is a predetermined category; and a marketing message verification apparatus, configured to receive the encrypted marketing message, and send the merchant information and the marketing activity information corresponding to the merchant information that are in the encrypted marketing message to the terminal device if verification of the encrypted marketing message by the marketing message verification apparatus succeeds.

A third aspect provides a signal broadcast device, including: a first broadcast unit, configured to broadcast a wakeup message in a predetermined range, where the wakeup message is used to wake up a specified application in a terminal device when the specified application is in a disabled state; and a second broadcast unit, configured to broadcast encrypted marketing information in the predetermined range, where the encrypted marketing message includes merchant information and marketing activity information corresponding to the merchant information.

A fourth aspect provides a terminal device, including: a first receiving unit, configured to receive a wakeup message broadcast by a signal broadcast device in a predetermined range, where the wakeup message is used to wake up a specified application in the terminal device when the specified application is in a disabled state; a second receiving unit, configured to receive encrypted marketing information broadcast by the signal broadcast device in the predetermined range, where the encrypted marketing message includes merchant information and marketing activity information corresponding to the merchant information; and a sending unit, configured to send the encrypted marketing message to a marketing message verification apparatus for verification if the terminal device determines that a category of the encrypted marketing message is a predetermined category.

A fifth aspect provides a marketing message verification apparatus, including: a receiving unit, configured to receive an encrypted marketing message; and a sending unit, configured to send merchant information and the marketing activity information corresponding to the merchant information that are in the encrypted marketing message to a terminal device if verification of the encrypted marketing message succeeds.

A sixth aspect provides an electronic device, where the electronic device includes: a processor; and a memory, configured to store a computer executable instruction, where when the executable instruction is being executed, the processor performs the following operations: broadcasting a wakeup message in a predetermined range, where the wakeup message is used to wake up a specified application in a terminal device when the specified application is in a disabled state; and broadcasting encrypted marketing information in the predetermined range, where the encrypted marketing message includes merchant information and marketing activity information corresponding to the merchant information.

A seventh aspect provides a computer readable storage medium, where the computer readable storage medium stores one or more programs, and when the one or more programs are executed by an electronic device that includes a plurality of application programs, the electronic device performs the following operations: broadcasting a wakeup message in a predetermined range, where the wakeup message is used to wake up a specified application in a terminal device when the specified application is in a disabled state; and broadcasting encrypted marketing information in the predetermined range, where the encrypted marketing message includes merchant information and marketing activity information corresponding to the merchant information.

An eighth aspect provides an electronic device, where the electronic device includes: a processor; and a memory, configured to store a computer executable instruction, where when the executable instruction is being executed, the processor performs the following operations: receiving a wakeup message broadcast by a signal broadcast device in a predetermined range, where the wakeup message is used to wake up a specified application in a terminal device when the specified application is in a disabled state; receiving encrypted marketing information broadcast by the signal broadcast device in the predetermined range, where the encrypted marketing message includes merchant information and marketing activity information corresponding to the merchant information; and sending the encrypted marketing message to a marketing message verification apparatus for verification if the terminal device determines that a category of the encrypted marketing message is a predetermined category.

A ninth aspect provides a computer readable storage medium, where the computer readable storage medium stores one or more programs, and when the one or more programs are executed by an electronic device that includes a plurality of application programs, the electronic device performs the following operations: receiving a wakeup message broadcast by a signal broadcast device in a predetermined range, where the wakeup message is used to wake up a specified application in a terminal device when the specified application is in a disabled state; receiving encrypted marketing information broadcast by the signal broadcast device in the predetermined range, where the encrypted marketing message includes merchant information and marketing activity information corresponding to the merchant information; and sending the encrypted marketing message to a marketing message verification apparatus for verification if the terminal device determines that a category of the encrypted marketing message is a predetermined category.

A tenth aspect provides an electronic device, where the electronic device includes: a processor; and a memory, configured to store a computer executable instruction, where when the executable instruction is being executed, the processor performs the following operations: receiving an encrypted marketing message; and sending merchant information and marketing activity information corresponding to the merchant information that are in the encrypted marketing message to terminal device if verification of the encrypted marketing message succeeds.

An eleventh aspect provides a computer readable storage medium, where the computer readable storage medium stores one or more programs, and when the one or more programs are executed by an electronic device that includes a plurality of application programs, the electronic device performs the following operations: receiving an encrypted marketing message; and sending merchant information and marketing activity information corresponding to the merchant information that are in the encrypted marketing message to a terminal device if verification of the encrypted marketing message succeeds.

In the embodiments of the present application, at least the following technical effects can be achieved by using the previous technical solutions:

In the methods provided in the embodiments of the present application, when the specified application in the terminal device is in a disabled state, the specified application can be waken up based on the received wakeup message, and after the specified application is waken up, the encrypted marketing message broadcast by the signal broadcast device is received. When it is determined that the category of the encrypted marketing message is the predetermined category, the encrypted marketing message is sent to the marketing message verification apparatus for verification. The marketing message verification apparatus can send the merchant information and the marketing activity information corresponding to the merchant information that are in the encrypted marketing message to the terminal device if the marketing message verification apparatus determines that verification of the encrypted market message succeeds. As such, when a user enters a store or a shopping mall, a specified application in a terminal device of the user can be waken up by using a wakeup message broadcast by a signal broadcast device disposed in the store or the shopping mall. After the specified application is waken up, the marketing message broadcast by the signal broadcast device can be received, so that the user can obtain promotion information of the store or the shopping mall in time without asking a clerk.

BRIEF DESCRIPTION OF DRAWINGS

The accompanying drawings described here are intended to provide a further understanding of the present application, and constitute a part of the present application. The illustrative embodiments of the present application and descriptions thereof are intended to describe the present application, and do not constitute limitations on the present application. In the accompanying drawings.

DESCRIPTION OF EMBODIMENTS

To make the objectives, technical solutions, and advantages of the present application clearer, the following clearly and comprehensively describes the technical solutions of the present application with reference to specific embodiments and accompanying drawings of the present application. Clearly, the described embodiments are merely some rather than all of the embodiments of the present application. All other embodiments obtained by a person of ordinary skill in the art based on the embodiments of the present application without creative efforts shall fall within the protection scope of the present application.

The technical solutions provided in the embodiments of the present application are described in detail below with reference to the accompanying drawings.

To alleviate a problem in the existing technology that a method that a consumer determines a latest promotion of a merchant or a shopping mall is not optimized enough, the embodiments of the present specification provide a sales promotion method.

Sales promotion is a method that improves sales performance of stores or retailers through a series of marketing combination means at the terminals of the marketing channels.

Figure 2:
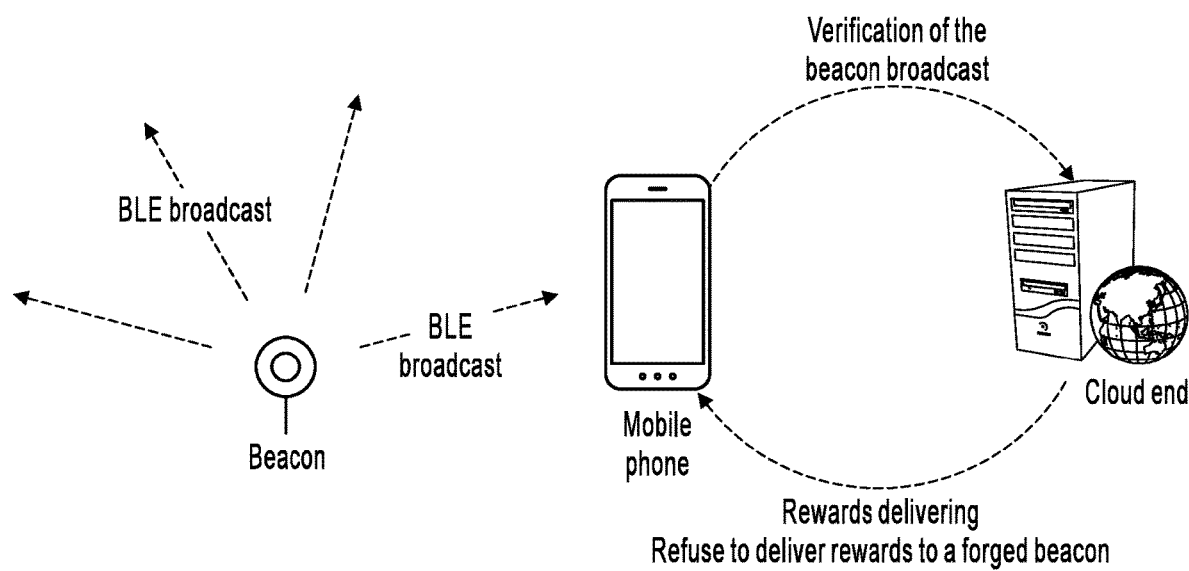
FIG. 2 is a schematic diagram illustrating application of a sales promotion method in an actual scenario, according to an embodiment of the present specification.

The sales promotion method provided in the embodiments of the present specification relates to interaction between three types of devices: a signal broadcast device, a terminal device, and a marketing message verification apparatus. In an actual application scenario, the signal broadcast device can be a Bluetooth beacon device. The terminal device can include at least one of intelligent terminal devices easy to carry by users such as a mobile phone, a tablet computer, and a smart wristband. The marketing message verification apparatus can be a back end server device such as a cloud server. FIG. 2 is a schematic diagram illustrating application of a sales promotion method in an actual scenario, according to some embodiments of the present specification, including a Bluetooth beacon device, a mobile phone, and a cloud server. The Bluetooth beacon device sends a Bluetooth low energy (BLE) broadcast to the terminal device such as a mobile phone in a predetermined range.

Figure 1:
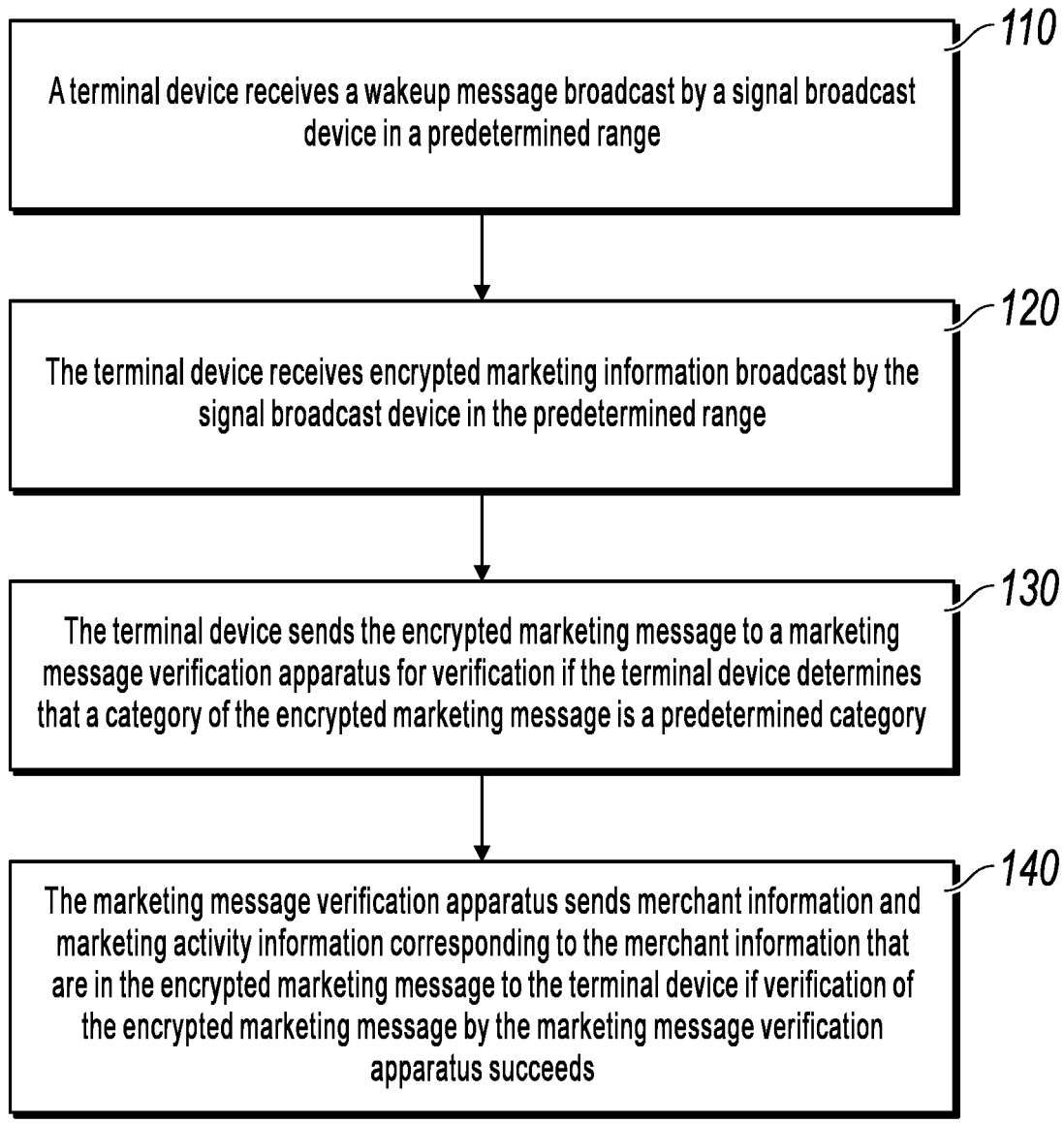
FIG. 1 is a schematic diagram illustrating an implementation procedure of a sales promotion method, according to an embodiment of the present specification.

Specifically, a schematic flowchart illustrating a sales promotion method, according to one or more embodiments of the present specification is shown in FIG. 1. The sales promotion method includes the following steps:

Step 110: A terminal device receives a wakeup message broadcast by a signal broadcast device in a predetermined range, where the wakeup message is used to wake up a specified application in the terminal device when the specified application is in a disabled state.

It should be understood that with the rapid development of the terminal device and the mobile Internet technologies, there are more and more applications that a user chooses to install in the terminal device. After the user enables a plurality of applications in the terminal device, to reduce power consumption or avoid impact on running of an application that is being used by the user, a system of the terminal device usually kills a process of an application that is not used for a long time, that is, disables an applications that is not used for a long time after being enabled by the user. In this case, the specified application used to receive a message broadcast by the signal broadcast device in some embodiments of the present specification could be disabled as well.

To avoid that the message broadcast by the signal broadcast device cannot be received in time after the specified application is disabled, the signal broadcast device in this embodiment of the present specification can periodically broadcast the wakeup message to the terminal device in the predetermined range. The wakeup message is used to wake up the specified application in the terminal device when the specified application is in a disabled state. For example, the signal broadcast device is a Bluetooth beacon device. The wakeup message broadcast by the Bluetooth beacon device in the predetermined range can be a beacon signal with a fixed structure.

It is worthwhile to note that to prevent a malicious person from illegally broadcasting some illegal messages such as some illegal advertisements and illegal statements to a user by using the signal broadcast device such as the Bluetooth beacon device, there is a predetermined mapping relationship between the signal broadcast device and the terminal device in one or more embodiments of the present specification. To be specific, the terminal device can receive a message broadcast by only a signal broadcast device having the predetermined mapping relationship with the terminal device.

Step 120: The terminal device receives encrypted marketing information broadcast by the signal broadcast device in the predetermined range, where the encrypted marketing message includes merchant information and marketing activity information corresponding to the merchant information.

To avoid that the specified application in the terminal device is disabled by a system, and the specified application cannot receive a marketing message broadcast by the signal broadcast device, in one or more embodiments of the present specification, after the terminal device receives the wakeup message broadcast by the signal broadcast device in the predetermined range, if the specified application in the terminal device is in a disabled state, the terminal device first wakes up the specified application based on the wakeup message; and then the terminal device monitors, by using the specified application, the message broadcast by the signal broadcast device.

In a process that the terminal device monitors, by using the specified application, the message broadcast by the signal broadcast device, the terminal device can receive the encrypted marketing message if the signal broadcast device broadcasts the encrypted marketing message to the terminal device in the predetermined range, and the terminal device falls within the predetermined range of the signal broadcast device. To improve a security level of the marketing message, and prevent the terminal device from receiving an illegal marketing message, the marketing message broadcast by the signal broadcast device to the terminal device in the predetermined range is an encrypted marketing message, and the marketing message can be broadcast to the terminal device in the predetermined range in a form of a dynamically changed beacon signal. To reduce a calculation amount of the signal broadcast device, reduce power consumption of the signal broadcast device, and prolong a battery usage time of the signal broadcast device, a frequency for encrypting the marketing message can be dynamically changed. For example, the marketing message can be encrypted per second in a predetermined time period, and the marketing message obtained after the previous encryption is used in the next second. The marketing message is encrypted per two seconds in another predetermined time period, and the marketing message after the previous encryption is used in the next two seconds.

The marketing activity information corresponding to the merchant information included in the marketing message can include a reward, a coupon, etc. provided by a merchant that are used to encourage the user to perform consumption.

Step 130: The terminal device sends the encrypted marketing message to a marketing message verification apparatus for verification if the terminal device determines that a category of the encrypted marketing message is a predetermined category.

To avoid excessive data processed by the marketing message verification apparatus to reduce processing pressure of the marketing message verification apparatus, the terminal device in one or more embodiments of the present specification can perform preliminary selection on the encrypted marketing message based on a category identifier of the encrypted marketing message after receiving the encrypted marketing message, and send an encrypted marketing message passes preliminary selection to the marketing message verification apparatus for further verification. In this case, if the terminal device determines that the category of the encrypted marketing message is the predetermined category, the terminal device sends the encrypted marketing message to the marketing message verification apparatus for verification. Specifically, the terminal device can first obtain an information category identifier in the encrypted marketing message. Then if the information category identifier matches an information category identifier of the predetermined category, the terminal device sends the encrypted marketing message to the marketing message verification apparatus for verification.

Step 140: The marketing message verification apparatus sends the merchant information and the marketing activity information corresponding to the merchant information that are in the encrypted marketing message to the terminal device if verification of the encrypted marketing message by the marketing message verification apparatus succeeds.

To improve a security level of the marketing message and protect user interests, in addition to the category identifier, a data packet carrying the encrypted marketing message can further include a device identifier of the signal broadcast device broadcasting the encrypted marketing message, a physical address (namely, a MAC address) of the signal broadcast device broadcasting the encrypted marketing message, and a timestamp for broadcasting the encrypted marketing message. To prevent the marketing message from being maliciously decrypted and obtained by a malicious person, the physical address of the signal broadcast device broadcasting the encrypted marketing message and the timestamp for broadcasting the encrypted marketing message can be encrypted by using a key.

Figure 5:
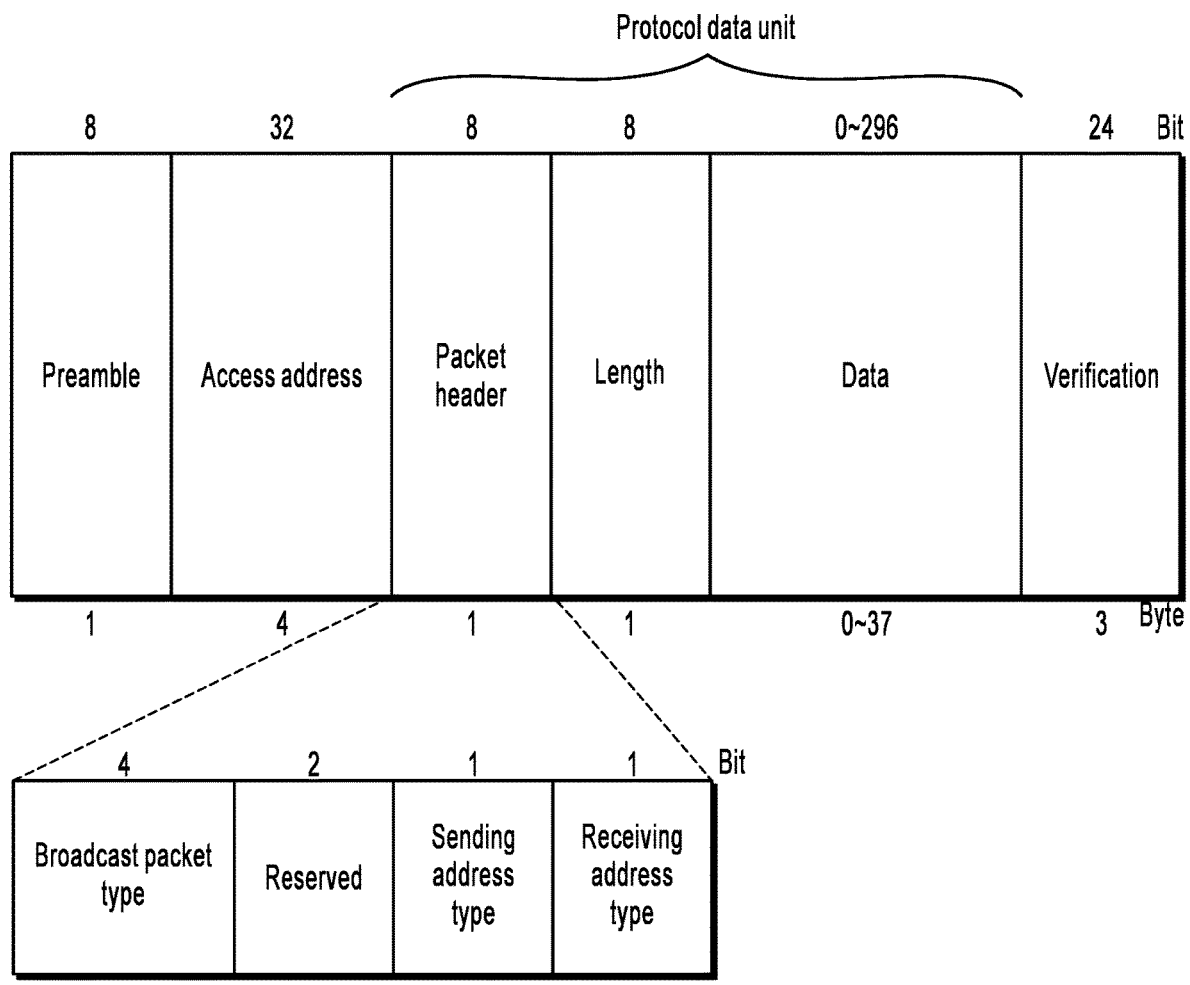
FIG. 5 is a schematic structural diagram illustrating a data packet broadcast by a signal broadcast device in a sales promotion method, according to an embodiment of the present specification.

FIG. 5 is a schematic structural diagram illustrating a data packet carrying a wakeup message or an encrypted marketing message, according to one or more embodiments of the present specification. As shown in FIG. 5, the data packet has at most 37 bytes of data information. When the data packet shown in FIG. 5 is a schematic structural diagram of a data packet carrying the encrypted marketing message, a data information part of the data packet can include 4-byte category identification information+3-byte device identification information of the signal broadcast device+6-byte MAC address+8-byte timestamp. MAC address+timestamp can be encrypted by using an advanced encryption standard (AES) key corresponding to the device identifier, and a ciphertext length obtained after AES encryption (assume that a filling mode of PKCS5/7 is used)=(plain text length/16+1)*16=(14/16+1)*16=16, plus 4-byte category information and 3-byte device ID, where 4+3+16=23-byte<37 bytes, which can be sent in a form of BLE broadcast data packet.

Optionally, if verification of the encrypted marketing message by the marketing message verification apparatus succeeds, the marketing message verification apparatus sends the merchant information and the marketing activity information corresponding to the merchant information that are in the encrypted marketing message to the terminal device. The marketing message verification apparatus can first obtain the information category identifier in the encrypted marketing message. Then if the information category identifier matches the information category identifier of the predetermined category, the marketing message verification apparatus obtains a signal broadcast device identifier included in the encrypted marketing message. The marketing message verification apparatus verifies the encrypted marketing message based on the signal broadcast device identifier included in the encrypted marketing message. Finally, if verification of the encrypted marketing message by the marketing message verification apparatus succeeds, the marketing message verification apparatus sends the merchant information and the marketing activity information corresponding to the merchant information that are in the encrypted marketing message to the terminal device.

Optionally, the marketing message verification apparatus verifies the encrypted marketing message based on the signal broadcast device identifier included in the encrypted marketing message. Specifically, the marketing message verification apparatus first obtains an advanced encryption standard (AES) key corresponding to the signal broadcast device identifier included in the encrypted marketing message and a reference physical address corresponding to the signal broadcast device identifier included in the encrypted marketing message. Then the marketing message verification apparatus decrypts the encrypted marketing message based on the AES key corresponding to the signal broadcast device identifier included in the encrypted marketing message, to obtain a timestamp included in the encrypted marketing message and a physical address of the signal broadcast device broadcasting the encrypted marketing message. Finally, if the physical address of the signal broadcast device broadcasting the encrypted marketing message matches the reference physical address, and the time stamp and a current system time in the marketing message verification apparatus are in a same predetermined time period, the marketing message verification apparatus determines that verification of the encrypted marketing message verification succeeds.

As shown in FIG. 2, when the BLE broadcast received by the mobile phone is an encrypted marketing message, the mobile phone can first perform preliminary selection on the encrypted marketing message based on the category identifier of the encrypted marketing message, and sends an encrypted marketing message passing the selection to the cloud server for verification. Only a marketing message that passes verification by the cloud server is sent to the mobile phone side, and in this case, the mobile phone side can receive a marketing activity message such as an incentive reward message or a coupon message in the marketing message. In addition, the cloud server refuses to send a marketing massage that does not pass verification of the cloud server to the mobile phone.

It is avoided that a quantity of times that the terminal device receives the wakeup message broadcast by the signal broadcast device and a quantity of times that the terminal device receives the encrypted marketing message broadcast by the signal broadcast device are imbalanced in a period of time, that is, the quantity of times that the terminal device receives the wakeup message broadcast by the signal broadcast device is too large or too small in the time period, or the quantity of times that the terminal device receives the encrypted marketing message broadcast by the signal broadcast device is too large or too small, which can affect user experience of receiving the marketing message.

To avoid the previous case, in one or more embodiments of the present specification, the marketing message verification apparatus can further monitor a log reported by the terminal device. The log reported by the terminal device includes a first time point that the wakeup message is received and a second time point that the encrypted marketing message is received. Then the marketing message verification apparatus can determine, based on the first time point and the second time point, a first quantity of times that the terminal device receives the wakeup message within the predetermined time period and a second quantity of times that the terminal device receives the encrypted marketing message. The marketing message verification apparatus can send a time interval update message to the terminal device based on the first quantity of times and the second quantity of times if a ratio between the first quantity of times and the sum of the first quantity of times and the second quantity of times is less than or equal to the first predetermined threshold, or a ratio between the second quantity of times and the sum of the first quantity of times and the second quantity of times is less than or equal to the second predetermined threshold.

The time interval update message includes a third frequency for broadcasting the wakeup message and a fourth frequency for broadcasting the encrypted marketing message. The time interval update message is used by the signal broadcast device to update the frequency for broadcasting the wakeup message and the frequency for broadcasting the encrypted marketing message.

Optionally, the time interval update message can be sent to the signal broadcast device by using the terminal device. Specifically, the terminal device can first receive the time interval update message. Then if the terminal device detects that a distance from the signal broadcast device falls within a predetermined range, the terminal device sends the time interval update message to the signal broadcast device.

Figure 3:
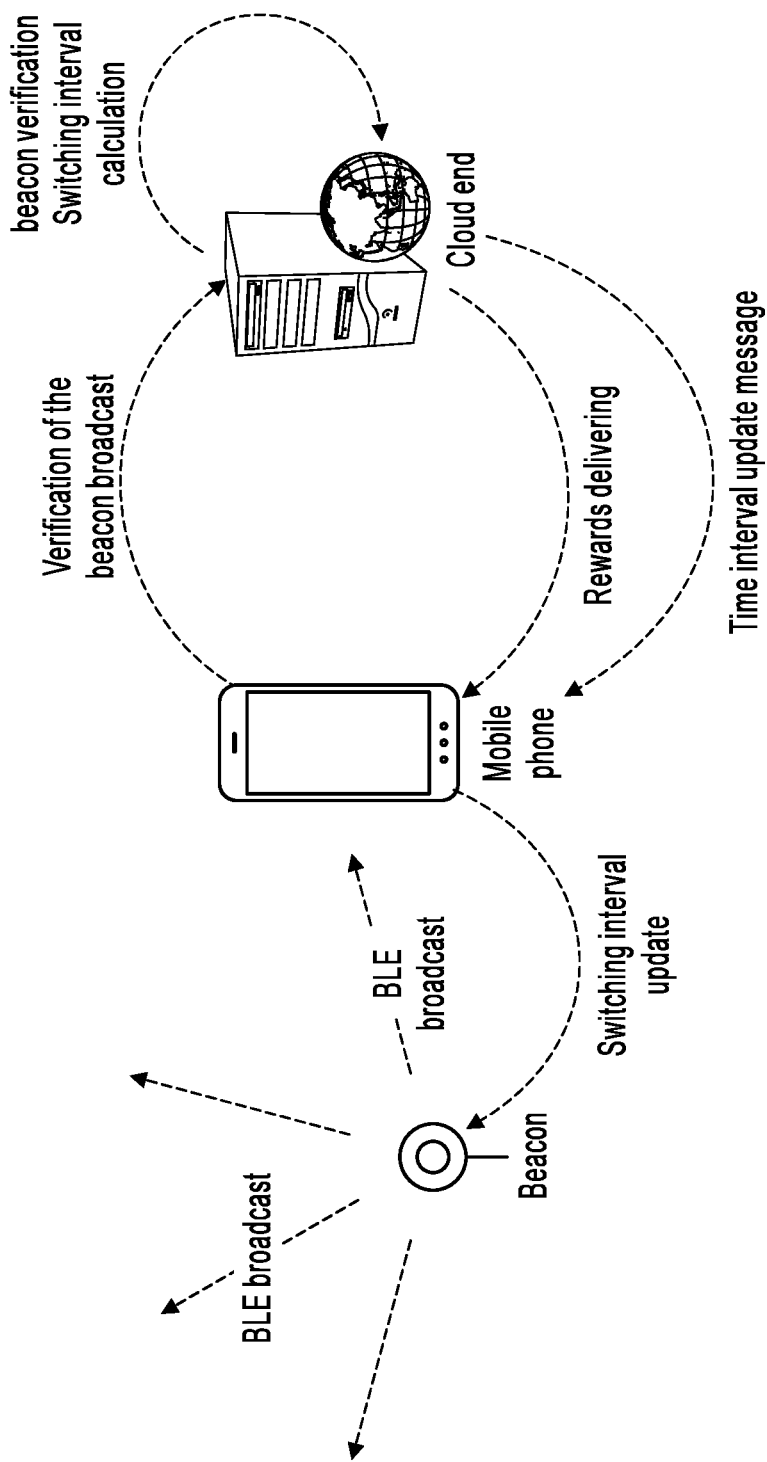
FIG. 3 is a schematic diagram illustrating an implementation procedure of a sales promotion method in another actual scenario, according to an embodiment of the present specification.

FIG. 3 is a schematic diagram illustrating application of a sales promotion method in another actual scenario, according to the present specification. A difference between FIG. 3 and FIG. 2 lies in that a sending procedure of a time interval update message is added to FIG. 3. As shown in FIG. 3, the cloud server can calculate, based on the log uploaded by the mobile phone, a quantity of times that the Bluetooth beacon device broadcasts the wakeup message and a quantity of times that the Bluetooth broadcasts the encrypted marketing message in the predetermined time period. If the cloud server determines that a time interval between a time that the Bluetooth beacon device broadcasts the wakeup message and a time that the Bluetooth broadcasts the encrypted marketing message is imbalanced, the cloud server can re-determine the time interval between the time that the Bluetooth beacon device broadcasts the wakeup message and the time that the Bluetooth beacon device broadcasts the encrypted marketing message, and sends the updated time interval to the Bluetooth beacon device by using the mobile phone.

Optionally, the terminal device can interact with the signal broadcast device through a Bluetooth connection, and send the time interval update message to the signal broadcast device through Bluetooth communication. In addition, to avoid a malicious change of a malicious person, the terminal device in one or more embodiments of the present specification can further encrypt the time interval update message when sending the time interval update message to the signal broadcast device. In this case, if the terminal device detects that the distance from the signal broadcast device falls within the predetermined range, the terminal device sends the time interval update message to the signal broadcast device. Specifically, if the terminal device detects that the distance from the signal broadcast device falls within the predetermined range, the terminal device first establishes a Bluetooth low-power connection with the signal broadcast device. Then the terminal device encrypts the time interval update message by using an AES key corresponding to the signal broadcast device. Finally, the terminal device sends the encrypted time interval update message to the signal broadcast device.

Optionally, after the terminal device sends the time interval update message to the signal broadcast device in the predetermined range, the signal broadcast device can first receive the time interval update message from the terminal device. Then the signal broadcast device decrypts the time interval update message by using the AES key corresponding to the signal broadcast device. Finally, if verification of device identifier information included in the decrypted time interval update message succeeds, the signal broadcast device can update, based on the third frequency and the fourth frequency in the decrypted time interval update message, the frequency for broadcasting the wakeup message and the frequency for broadcasting encrypted marketing message.

Optionally, to improve a security level on the signal broadcast device side, the signal broadcast device can further reserve a device identifier of the signal broadcast device to verify whether the time interval update message is used to change a time interval of the signal broadcast device. If verification of the device identifier information included in the decrypted time interval update message succeeds, the signal broadcast device can update, based on the third frequency and the fourth frequency in the decrypted time interval update message, the frequency for broadcasting the wakeup message and the frequency for broadcasting the encrypted marketing message. Specifically, the signal broadcast device can first obtain the device identifier information included in the decrypted time interval update message. Then if the device identifier information matches the reserved device identifier information, the signal broadcast device updates, based on the third frequency and the fourth frequency in the decrypted time interval update message, the frequency for broadcasting the wakeup message and the frequency for broadcasting the encrypted marketing message. The reserved device identifier information is device identifier information of a terminal device that matches the signal broadcast device.

Figure 4:
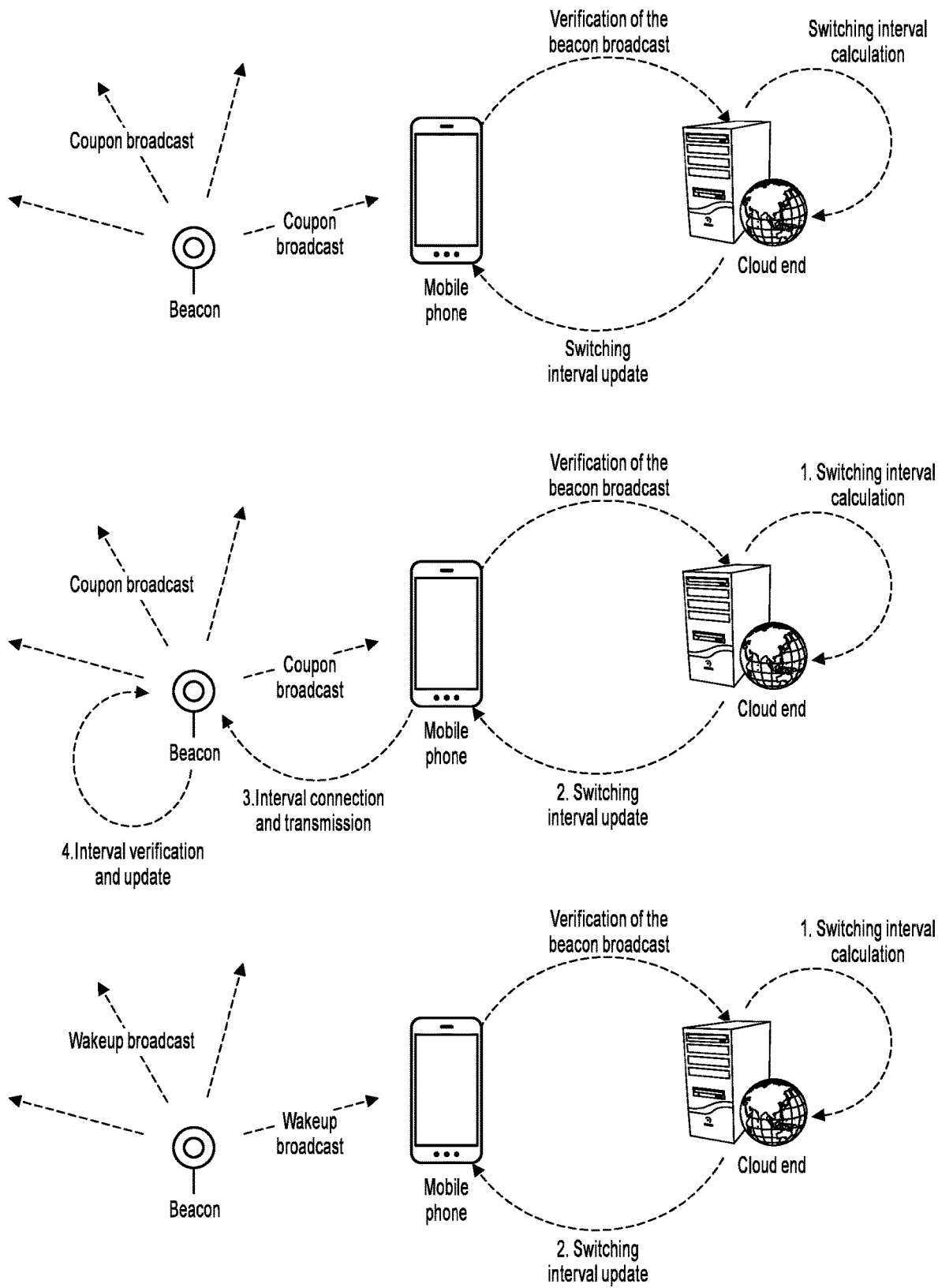
FIG. 4 is a schematic diagram illustrating application of time interval update in a sales promotion method in an actual scenario, according to an embodiment of the present specification.

FIG. 4 is a schematic diagram illustrating application of time interval update in a sales promotion method in an actual scenario, according to one or more embodiments of the present specification. As shown in FIG. 4(a), the cloud server calculates users previously choosing to enter a Bluetooth beacon device for more than once in a Bluetooth beacon device list that requires time interval update, and sends the time interval update message to the mobile phone. When the mobile phone enters the predetermined range of the Bluetooth beacon device again, the cloud server automatically sends the time interval update message to the Bluetooth beacon device. As shown in FIG. 4(b), when receiving the time interval update message, the Bluetooth beacon device decrypts and verifies the time interval update message, and updates the time interval of the Bluetooth beacon device after the verification succeeds. As shown in FIG. 4(c), after the Bluetooth beacon device updates the time interval of the Bluetooth beacon device, the Bluetooth beacon device cannot broadcast the wakeup message and the marketing message to the mobile phone within the predetermined range during a period of time that the mobile establishes a Bluetooth low-power connection with the Bluetooth beacon device. Therefore, to avoid that a specified application in the mobile phone within the predetermined range of the Bluetooth beacon device is disabled, the Bluetooth beacon device can broadcast the wakeup message to the mobile phone within the predetermined range of the Bluetooth beacon device.

It is worthwhile to note that to reduce impact of malicious tampering, after any other devices establish a Bluetooth low-power connection with the signal broadcast device, data of the first broadcast packet needs to be separately encrypted. The signal broadcast device first verifies whether MAC address+timestamp of the signal broadcast device is obtained after the data segment of the broadcast packet is decrypted. If an error occurs, it is considered that a subsequent broadcast packet is also wrong, the signal broadcast device proactively disconnects the Bluetooth low-power connection, refuses subsequent data sent by the device establishing a Bluetooth low-power connection with the signal broadcast device, and waits for another device to connect to the signal broadcast device, to update a time interval of the device.

It is worthwhile to note that to improve a security level of interaction between the signal broadcast device, the terminal device, and the marketing message verification apparatus, in one or more embodiments of the present specification, asymmetric keys can be used to encrypt and decrypt the marketing message and encrypt and decrypt the time interval update message.

In the methods provided in the embodiments of the present application, when the specified application in the terminal device is in a disabled state, the specified application can be waken up based on the received wakeup message, and after the specified application is waken up, the encrypted marketing message broadcast by the signal broadcast device is received. When it is determined that the category of the encrypted marketing message is the predetermined category, the encrypted marketing message is sent to the marketing verification apparatus for verification. When it is determined that verification of the encrypted marketing verification message succeeds, the marketing verification apparatus can send the merchant information and the marketing activity information corresponding to the merchant information that are in the encrypted marketing message to the terminal device. As such, when a user enters a store or a shopping mall, a specified application in a terminal device of the user can be waken up by using a wakeup message broadcast by a signal broadcast device disposed in the store or the shopping mall. After the specified application is waken up, the marketing message broadcast by the signal broadcast device can be received, so that the user can obtain promotion information of the store or the shopping mall in time without asking a clerk.

Figure 6:
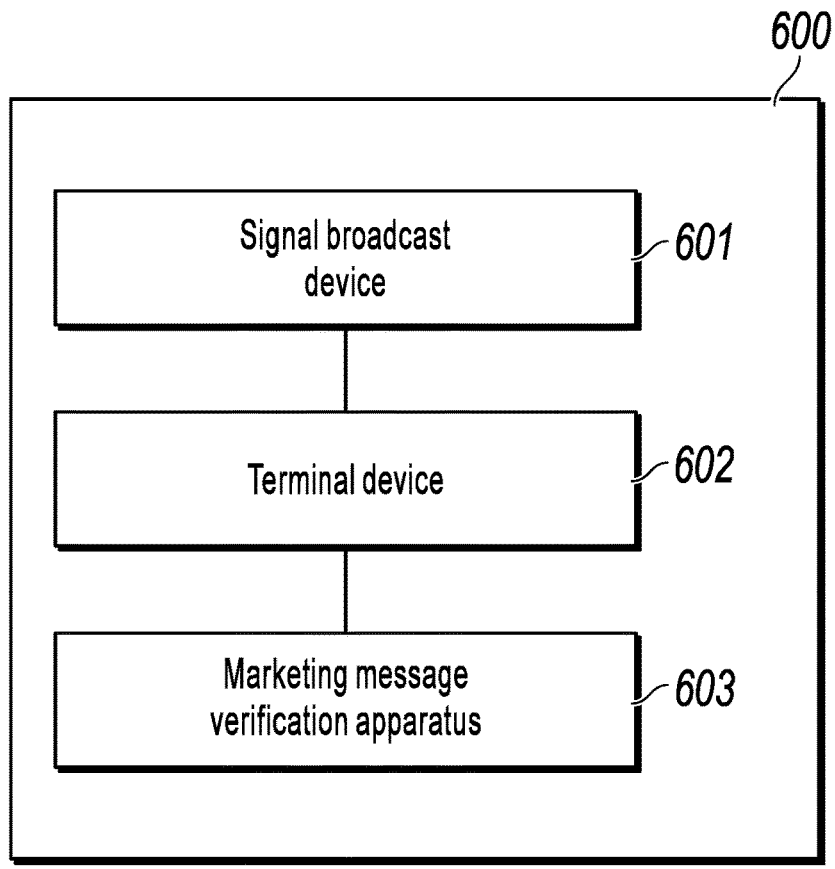
FIG. 6 is a schematic structural diagram illustrating a sales promotion system, according to an embodiment of the present specification.

FIG. 6 is a schematic structural diagram illustrating a sales promotion system 600 according to the present specification. Referring to FIG. 6, in a software implementation, the marketing system 600 can include a signal broadcast device 601, a terminal device 602, and a marketing message verification apparatus 603.

The signal broadcast device 601 is configured to: broadcast a wakeup message in a predetermined range, where the wakeup message is used to wake up a specified application in the terminal device when the specified application is in a disabled state; and broadcast encrypted marketing information in the predetermined range.

The terminal device 602 is configured to receive the wakeup message broadcast by the signal broadcast device in the predetermined range, where the wakeup message is used to wake up the specified application in the terminal device when the specified application is in a disabled state; receive the encrypted marketing information broadcast by the signal broadcast device in the predetermined range, where the encrypted marketing message includes merchant information and marketing activity information corresponding to the merchant information; and send the encrypted marketing message to a marketing message verification apparatus for verification if the terminal device determines that a category of the encrypted marketing message is a predetermined category.

The marketing message verification apparatus 603 is configured to receive the encrypted marketing message, and send the merchant information and the marketing activity information corresponding to the merchant information that are in the encrypted marketing message to the terminal device if verification of the encrypted marketing message by the marketing message verification apparatus succeeds.

Optionally, in an implementation, the terminal device 602 wakes up the specified application in the terminal device 602 based on the wakeup message if the specified application is in a disabled state.

The terminal device 602 monitors, by using the specified application, a message broadcast by the signal broadcast device 601.

Optionally, in an implementation, the terminal device 602 obtains an information category identifier in the encrypted marketing message; and sends the encrypted marketing message to the marketing message verification apparatus for verification if the information category identifier matches an information category identifier of the predetermined category.

Optionally, in an implementation, the marketing message verification apparatus 603 obtains an information category identifier in the encrypted marketing message.

The marketing message verification apparatus 603 obtains a signal broadcast device identifier included in the encrypted marketing message if the information category identifier matches the information category identifier of the predetermined category.

The marketing message verification apparatus 603 verifies the encrypted marketing message based on the signal broadcast device identifier included in the encrypted marketing message.

The marketing message verification apparatus 603 sends the merchant information and the marketing activity information corresponding to the merchant information that are in the encrypted marketing message to the terminal device if verification of the encrypted marketing message by the marketing message verification apparatus 603 succeeds.

Optionally, in an implementation, the marketing message verification apparatus 603 obtains an advanced encryption standard AES key corresponding to the signal broadcast device identifier included in the encrypted marketing message and a reference physical address corresponding to the signal broadcast device identifier included in the encrypted marketing message.

The marketing message verification apparatus 603 decrypts the encrypted marketing message based on the AES key corresponding to the signal broadcast device identifier included in the encrypted marketing message, to obtain a timestamp included in the encrypted marketing message and a physical address of the signal broadcast device broadcasting the encrypted marketing message.

The marketing message verification apparatus 603 determines that verification of the encrypted marketing message succeeds if the physical address of the signal broadcast device broadcasting the encrypted marketing message matches the reference physical address, and the timestamp and a current system time in the marketing message verification apparatus are in a same predetermined time period.

Optionally, in an implementation, the marketing message verification apparatus 603 monitors a log reported by the terminal device, where the log reported by the terminal device includes a first time point that the wakeup message is received and a second time point that the encrypted marketing message is received.

The marketing message verification apparatus 603 determines, based on the first time point and the second time point, a first quantity of times that the terminal device receives the wakeup message in the predetermined time period and a second quantity of times that the terminal device receives the encrypted marketing message.

The marketing message verification apparatus 603 sends a time interval update message to the terminal device 602 based on the first quantity of times and the second quantity of times if a ratio between the first quantity of times and the sum of the first quantity of times and the second quantity of times is less than or equal to a first predetermined threshold, or a ratio between the second quantity of times and the sum of the first quantity of times and the second quantity of times is less than or equal to a second predetermined threshold, where the time interval update message includes a third frequency for broadcasting the wakeup message and a fourth frequency for broadcasting the encrypted marketing message.

Optionally, in an implementation, the terminal device 602 receives the time interval update message. The terminal device 602 sends the time interval update message to the signal broadcast device 601 if the terminal device 602 detects that a distance from the signal broadcast device 601 falls within a predetermined range.

Optionally, in an implementation, the terminal device 602 establishes a Bluetooth low-power connection with the signal broadcast device 601 if the terminal device 602 detects that the distance from the signal broadcast device 601 falls within the predetermined range.

The terminal device 602 encrypts the time interval update message by using the AES key corresponding to the signal broadcast device 601.

The terminal device 602 sends the encrypted time interval update message to the signal broadcast device.

Optionally, in an implementation, the signal broadcast device 601 receives the time interval update message from the terminal device.

The signal broadcast device 601 decrypts the time interval update message by using the AES key corresponding to the signal broadcast device 601.

The signal broadcast device 601 updates, based on the third frequency and the fourth frequency in the decrypted time interval update message, a frequency for broadcasting the wakeup message and a frequency for broadcasting the encrypted marketing message if verification of device identifier information included in the decrypted time interval update message succeeds.

Optionally, in an implementation, the signal broadcast device 601 obtains device identifier information included in the decrypted time interval update message.

If the device identifier information matches reserved device identifier information, the signal broadcast device 601 updates, based on the third frequency and the fourth frequency in the decrypted time interval update message, the frequency for broadcasting the wakeup message and the frequency for broadcasting the encrypted marketing message.

The reserved device identifier information is device identifier information of a terminal device matching the signal broadcast device.

Optionally, in an implementation, there is a predetermined mapping relationship between the terminal device 602 and the signal broadcast device 601.

The sales promotion system 600 can implement the methods in the method embodiments in FIG. 1 to FIG. 5. For details, reference can be made to the sales promotion methods in the embodiments shown in FIG. 1 to FIG. 5. Details are omitted for simplicity.

Figure 7:
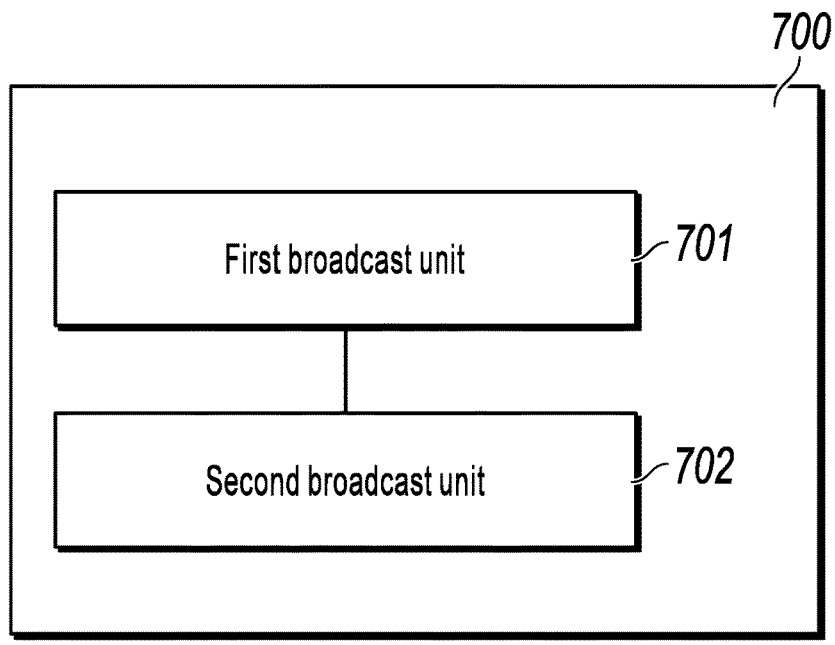
FIG. 7 is a schematic structural diagram illustrating a signal broadcast device, according to an embodiment of the present specification.

FIG. 7 is a schematic structural diagram illustrating a signal broadcast device system 700, according to the present specification. Referring to FIG. 7, in a software implementation, the signal broadcast device 700 can include a first broadcast unit 701 and a second broadcast unit 702.

The first broadcast device 701 is configured to broadcast a wakeup message in a predetermined range, where the wakeup message is used to wake up a specified application in a terminal device when the specified application is in a disabled state.

The second broadcast unit 702 is configured to broadcast encrypted marketing information in the predetermined range, where the encrypted marketing message includes merchant information and marketing activity information corresponding to the merchant information.

Optionally, in an implementation, the signal broadcast device 700 further includes: a receiving unit 703, configured to receive a time interval update message from the terminal device; a decryption unit 704, configured to decrypt the time interval update message by using an AES key corresponding to the signal broadcast device; and an update unit 705, configured to update, based on a third frequency and a fourth frequency in a decrypted time interval update message, a frequency for broadcasting the wakeup message and a frequency for broadcasting the encrypted marketing message if verification of device identifier information included in the decrypted time interval update message succeeds.

Optionally, in an implementation, the update unit 705 obtains the device identifier information included in the decrypted time interval update message.

If the device identifier information matches reserved device identifier information, the signal broadcast device updates, based on the third frequency and the fourth frequency in the decrypted time interval update message, the frequency for broadcasting the wakeup message and the frequency for broadcasting the encrypted marketing message.

The reserved device identifier information is device identifier information of a terminal device matching the signal broadcast device.

Optionally, in an implementation, there is a predetermined mapping relationship between the terminal device and the signal broadcast device.

The signal broadcast device 700 can implement the methods in the method embodiments in FIG. 1 to FIG. 5. For details, reference can be made to the sales promotion methods in the embodiments shown in FIG. 1 to FIG. 5. Details are omitted for simplicity.

Figure 8:
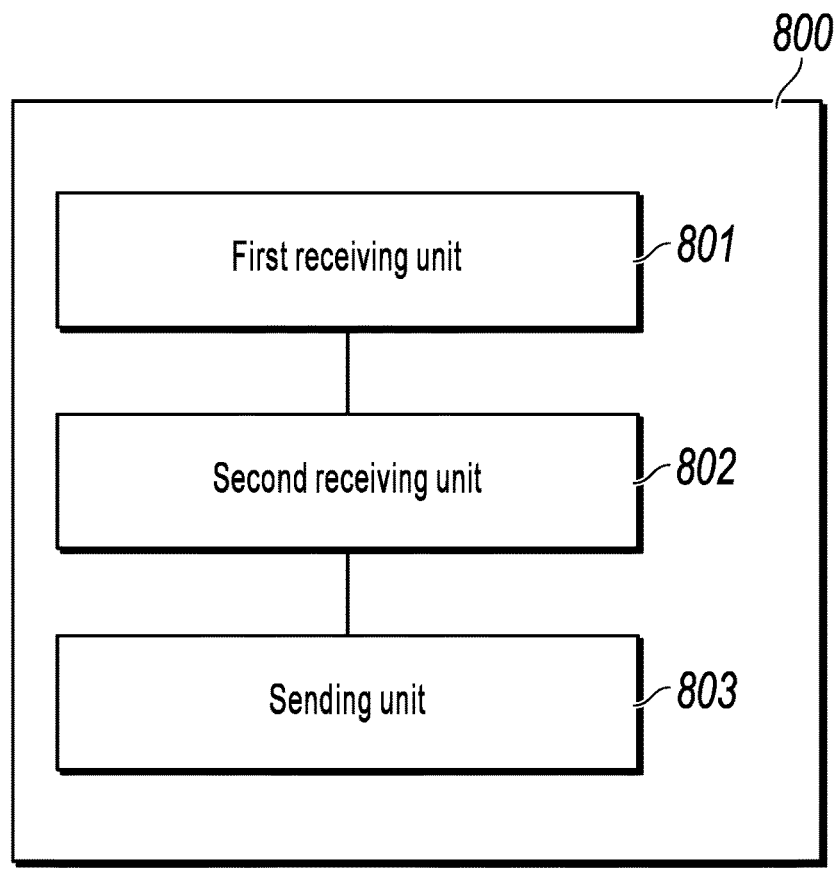
FIG. 8 is a schematic structural diagram illustrating a terminal device, according to an embodiment of the present specification.

FIG. 8 is a schematic structural diagram illustrating a terminal device 800, according to the present specification. Referring to FIG. 8, in software implementation, the terminal device 800 can include a first receiving unit 801, a second receiving unit 802, and a sending unit 803.

The first receiving unit 801 is configured to receive a wakeup message broadcast by a signal broadcast device in a predetermined range, where the wakeup message is used to wake up a specified application in a terminal device when the specified application is in a disabled state.

The second receiving unit 802 is configured to receive encrypted marketing information broadcast by the signal broadcast device in the predetermined range, where the encrypted marketing message includes merchant information and marketing activity information corresponding to the merchant information.

The sending unit 803 is configured to send the encrypted marketing message to a marketing message verification apparatus for verification if the terminal device determines that a category of the encrypted marketing message is a predetermined category.

Optionally, in an implementation, the terminal device 800 further includes: a wakeup unit 804, configured to wake up the specified application in the terminal device based on the wakeup message if the specified application is in a disabled state; and a monitoring unit 805, configured to monitor, by using the specified application, a message broadcast by the signal broadcast device.

Optionally, in an implementation, the sending unit 803 obtains an information category identifier in the encrypted marketing message; and sends the encrypted marketing message to the marketing message verification apparatus for verification if the information category identifier matches an information category identifier of the predetermined category.

Optionally, in an implementation, the terminal device 800 further includes: a third receiving unit 806, configured to receive a time interval update message; and a first sending unit 807, configured to send the time interval update message to the signal broadcast device if the terminal device detects that a distance from the signal broadcast device falls within the predetermined range.

Optionally, in an implementation, the first sending unit 807 establishes a Bluetooth low-power connection with the signal broadcast device if the terminal device detects that the distance from the signal broadcast device falls within the predetermined range.

The terminal device encrypts the time interval update message by using an AES key corresponding to the signal broadcast device.

The terminal device sends the encrypted time interval update message to the signal broadcast device.

Optionally, in an implementation, there is a predetermined mapping relationship between the terminal device and the signal broadcast device.

The terminal device 800 can implement the method in FIG. 1 to FIG. 5. For details, reference can be made to the sales promotion method in the embodiments shown in FIG. 1 to FIG. 5. Details are omitted for simplicity.

Figure 9:
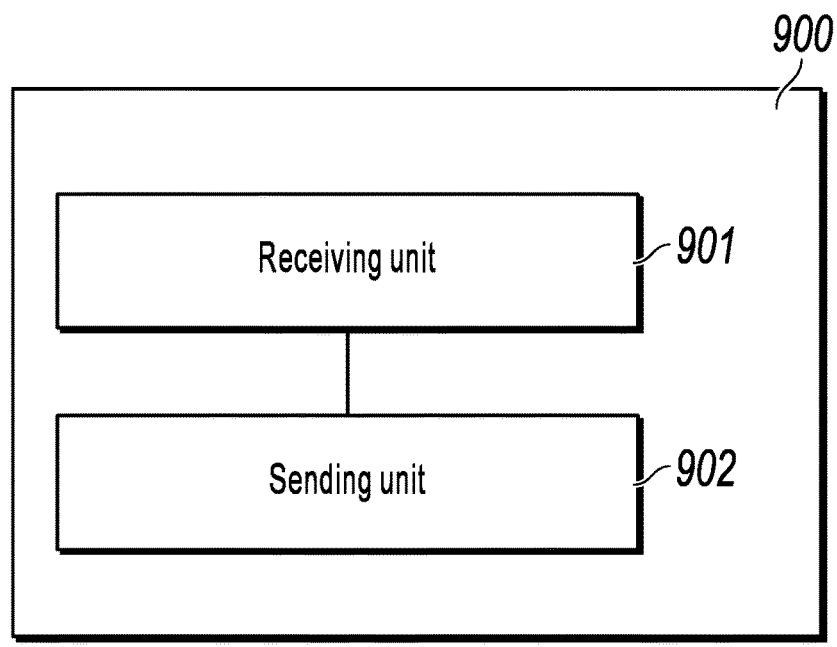
FIG. 9 is a schematic structural diagram illustrating a marketing message verification apparatus, according to an embodiment of the present specification.

FIG. 9 is a schematic structural diagram illustrating a marketing message verification apparatus 900, according to the present specification. Referring to FIG. 9, in a software implementation, the marketing message verification apparatus 900 can include a receiving unit 901 and a sending unit 902.

The receiving unit 901 is configured to receive an encrypted marketing message.

The sending unit 902 is configured to send merchant information and marketing activity information corresponding to the merchant information that are in the encrypted marketing message to a terminal device if verification of the encrypted marketing message succeeds.

Optionally, in an implementation, the sending unit 902 obtains an information category identifier in the encrypted marketing message; obtains a signal broadcast device identifier included in the encrypted marketing message if the information category identifier matches an information category identifier of the predetermined category; verifies the encrypted marketing message based on the signal broadcast device identifier included in the encrypted marketing message; and sends, by the marketing message verification apparatus, the merchant information and the marketing activity information corresponding to the merchant information that are in the encrypted marketing message to the terminal device if verification of the encrypted marketing message succeeds.

Optionally, in an implementation, the sending unit 902 obtains an advanced encryption standard AES key corresponding to the signal broadcast device identifier included in the encrypted marketing message and a reference physical address corresponding to the signal broadcast device identifier included in the encrypted marketing message; decrypts the encrypted marketing message based on the AES key corresponding to the signal broadcast device identifier included in the encrypted marketing message, to obtain a timestamp included in the encrypted marketing message and a physical address of the signal broadcast device broadcasting the encrypted marketing message; and determines that verification of the encrypted marketing message succeeds if the physical address of the signal broadcast device broadcasting the encrypted marketing message matches the reference physical address, and the timestamp and a current system time in the marketing message verification apparatus are in a same predetermined time period.

Optionally, in an implementation, the marketing message verification apparatus 900 further includes: a monitoring unit 903, configured to monitor a log reported by the terminal device, where the log reported by the terminal device includes a first time point that the wakeup message is received and a second time point that the encrypted marketing message is received; a determining unit 804, configured to determine, based on the first time point and the second time point, a first quantity of times that the terminal device receives the wakeup message in the predetermined time period and a second quantity of times that the terminal device receives the encrypted marketing message; and a first sending unit 805, configured to send a time interval update message to the terminal device based on the first quantity of times and the second quantity of times if a ratio between the first quantity of times and the sum of the first quantity of times and the second quantity of times is less than or equal to a first predetermined threshold, or a ratio between the second quantity of times and the sum of the first quantity of times and the second quantity of times is less than or equal to a second predetermined threshold, where the time interval update message includes a third frequency for broadcasting the wakeup message and a fourth frequency for broadcasting the encrypted marketing message.

Optionally, in an implementation, there is a predetermined mapping relationship between the terminal device and the signal broadcast device.

The marketing message verification apparatus 900 can implement the method in FIG. 1 to FIG. 5. For details, reference can be made to the sales promotion method in the embodiments shown in FIG. 1 to FIG. 5. Details are not described for simplicity.

Figure 10:
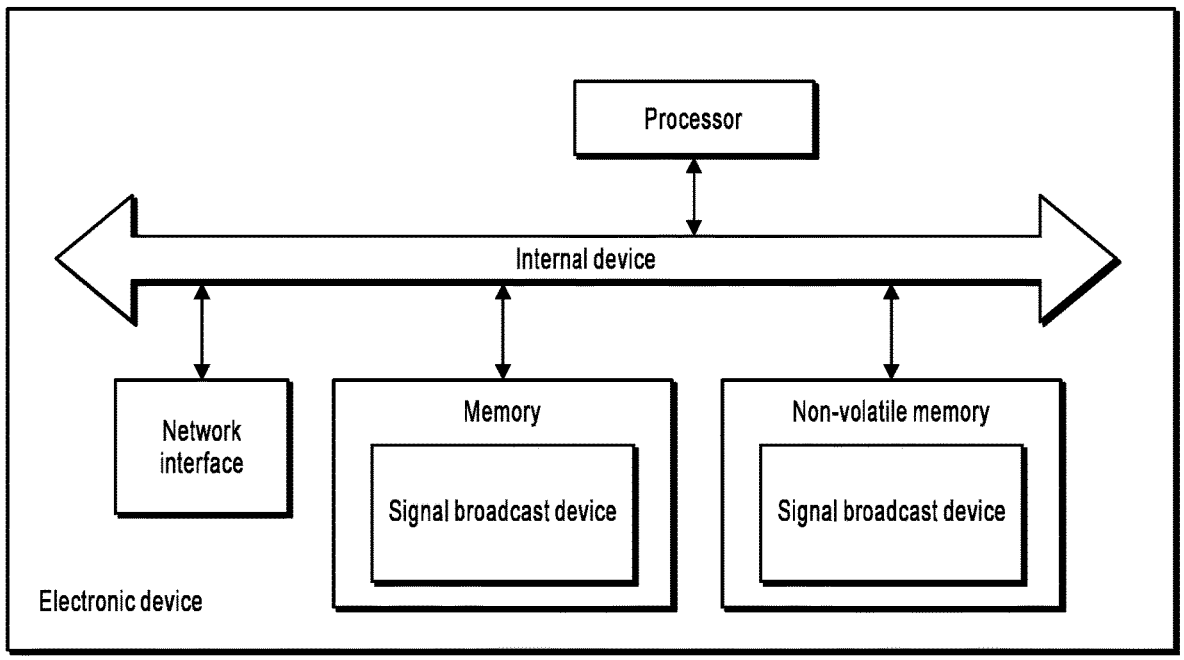
FIG. 10 is a schematic structural diagram illustrating an electronic device, according to an embodiment of the present specification.

FIG. 10 is a schematic structural diagram illustrating an electronic device, according to an embodiment of the present specification. Referring to FIG. 10, in terms of hardware, the electronic device includes a processor, and optionally further includes an internal bus, a network interface, and a storage. The storage can include a memory, for example, a high-speed random access memory (RAM), and can further include a nonvolatile memory (nonvolatile memory), for example, at least one magnetic disk storage. Certainly, the electronic device can further include hardware needed by another service.

The processor, the network interface, and the storage can be connected to each other by using the internal bus. The internal bus can be an industry standard architecture (ISA) bus, a Peripheral Component Interconnect (PCI) bus, an extended industry standard architecture (EISA) bus, etc. The bus can be classified into an address bus, a data bus, a control bus, etc. For ease of indication, the bus is indicated by using only one double-headed arrow in FIG. 10. However, it does not mean that there is only one bus or only one type of bus.

The storage is configured to store a program. The program can include program code, and the program code includes a computer operation instruction. The storage can include a memory and a nonvolatile memory, and provide an instruction and data for the processor.

The processor reads a corresponding computer program from the non-volatile memory to the memory for running, and a signal broadcast device is logically formed. The processor executes the program stored in the storage, and is configured to perform the following operations: broadcasting a wakeup message in a predetermined range, where the wakeup message is used to wake up a specified application in the terminal device when the specified application is in a disabled state; and broadcasting encrypted marketing information in the predetermined range, where the encrypted marketing message includes merchant information and marketing activity information corresponding to the merchant information.

The sales promotion methods disclosed in the embodiments shown in FIG. 1 to FIG. 5 in the present specification can be applied to a processor, or implemented by a processor. The processor can be an integrated circuit chip and have a signal processing capability. In an implementation process, steps in the previous methods can be implemented by using a hardware integrated logical circuit in the processor, or by using instructions in a form of software. The processor can be a general purpose processor, including a central processing unit (CPU), a network processor (NP), etc., or can be a digital signal processor (DSP), an application-specific integrated circuit (ASIC), a field programmable gate array (FPGA) or another programmable logic device, a discrete gate or a transistor logic device, a discrete hardware component, etc. The processor can implement or perform the methods, the steps, and the logical block diagrams disclosed in one or more of the embodiments of the present application. The general purpose processor can be a microprocessor, or the processor can be any conventional processor. The steps of the methods disclosed in one or more of the embodiments of the present application can be directly performed by a hardware decoding processor, or performed by a combination of hardware and software modules in a decoding processor. The software module can be located in a mature storage medium in the field, such as a random access memory, a flash memory, a read-only memory, a programmable read-only memory, an electrically erasable programmable memory, or a register. The storage medium is located in the storage, and the processor reads information in the storage and completes the steps in the previous methods in combination with hardware in the processor.

The electronic device can further execute the sales promotion methods in FIG. 1 to FIG. 5, and details omitted here in the present specification for simplicity.

Certainly, in addition to software implementation, the electronic device in the present specification does not exclude another implementation, for example, a logic device or a combination of hardware and software. That is, an execution body of the following processing procedure is not limited to each logical unit, and can also be hardware or a logic device.

Figure 11:
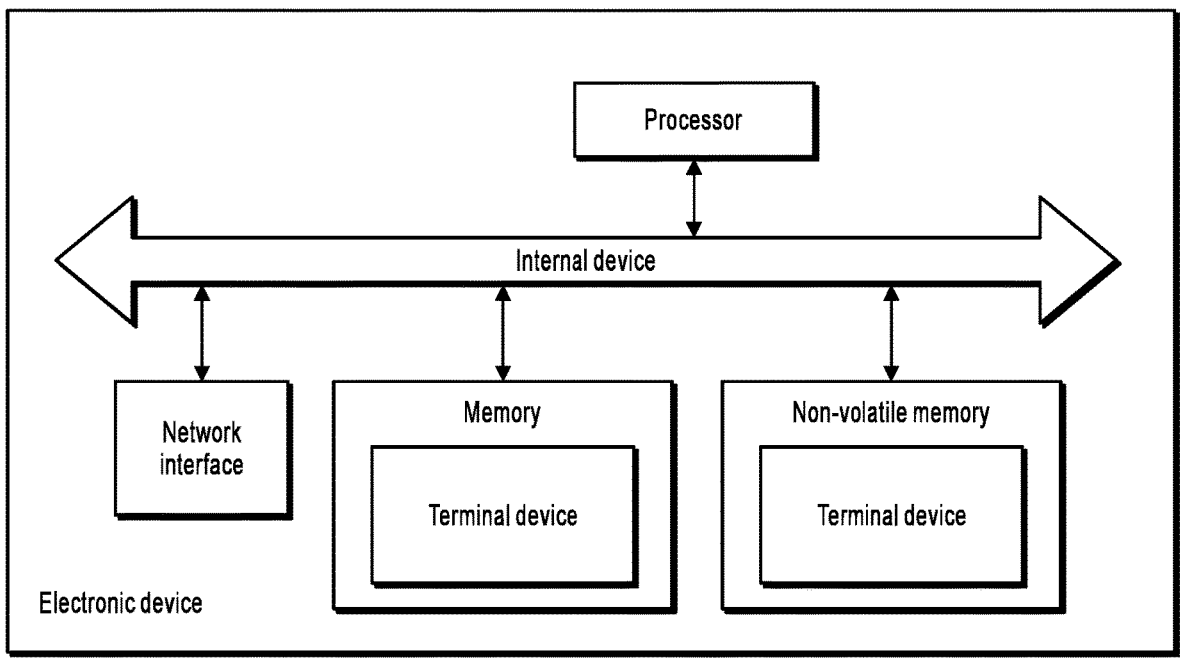
FIG. 11 is a schematic structural diagram illustrating another electronic device, according to an embodiment of the present specification.

FIG. 11 is a schematic structural diagram illustrating an electronic device, according to an embodiment of the present specification. Referring to FIG. 11, in terms of hardware, the electronic device includes a processor, and optionally further includes an internal bus, a network interface, and a storage. The storage can include a memory, for example, a high-speed random access memory (RAM), and can further include a nonvolatile memory (nonvolatile memory), for example, at least one magnetic disk storage. Certainly, the electronic device can further include hardware needed by another service.

The processor, the network interface, and the storage can be connected to each other by using the internal bus. The internal bus can be an industry standard architecture (ISA) bus, a Peripheral Component Interconnect (PCI) bus, an extended industry standard architecture (EISA) bus, etc. The bus can be classified into an address bus, a data bus, a control bus, etc. For ease of indication, the bus is indicated by using only one double-headed arrow in FIG. 11. However, it does not mean that there is only one bus or only one type of bus.

The storage is configured to store a program. The program can include program code, and the program code includes a computer operation instruction. The storage can include a memory and a nonvolatile memory, and provide an instruction and data for the processor.

The processor reads a corresponding computer program from the non-volatile memory to the memory for running, and a terminal device is logically formed. The processor executes the program stored in the storage, and is configured to perform the following operations: receiving a wakeup message broadcast by a signal broadcast device in a predetermined range, where the wakeup message is used to wake up a specified application in the terminal device when the specified application is in a disabled state; receiving encrypted marketing information broadcast by the signal broadcast device in the predetermined range, where the encrypted marketing message includes merchant information and marketing activity information corresponding to the merchant information; and sending the encrypted marketing message to a marketing message verification apparatus for verification if the terminal device determines that a category of the encrypted marketing message is a predetermined category.

The sales promotion methods disclosed in the embodiments shown in FIG. 1 to FIG. 5 in the present specification can be applied to a processor, or implemented by a processor. The processor can be an integrated circuit chip and have a signal processing capability. In an implementation process, steps in the previous methods can be implemented by using a hardware integrated logical circuit in the processor, or by using instructions in a form of software. The processor can be a general purpose processor, including a central processing unit (CPU), a network processor (NP), etc., or can be a digital signal processor (DSP), an application-specific integrated circuit (ASIC), a field programmable gate array (FPGA) or another programmable logic device, a discrete gate or a transistor logic device, a discrete hardware component, etc. The processor can implement or perform the methods, the steps, and the logical block diagrams disclosed in one or more of the embodiments of the present application. The general purpose processor can be a microprocessor, or the processor can be any conventional processor. The steps of the methods disclosed in one or more of the embodiments of the present application can be directly performed by a hardware decoding processor, or performed by a combination of hardware and software modules in a decoding processor. The software module can be located in a mature storage medium in the field, such as a random access memory, a flash memory, a read-only memory, a programmable read-only memory, an electrically erasable programmable memory, or a register. The storage medium is located in the storage, and the processor reads information in the storage and completes the steps in the previous methods in combination with hardware in the processor.

The electronic device can further execute the sales promotion methods in FIG. 1 to FIG. 5, and details omitted here in the present specification for simplicity.

Certainly, in addition to software implementation, the electronic device in the present specification does not exclude another implementation, for example, a logic device or a combination of hardware and software. That is, an execution body of the following processing procedure is not limited to each logical unit, and can also be hardware or a logic device.

Figure 12:
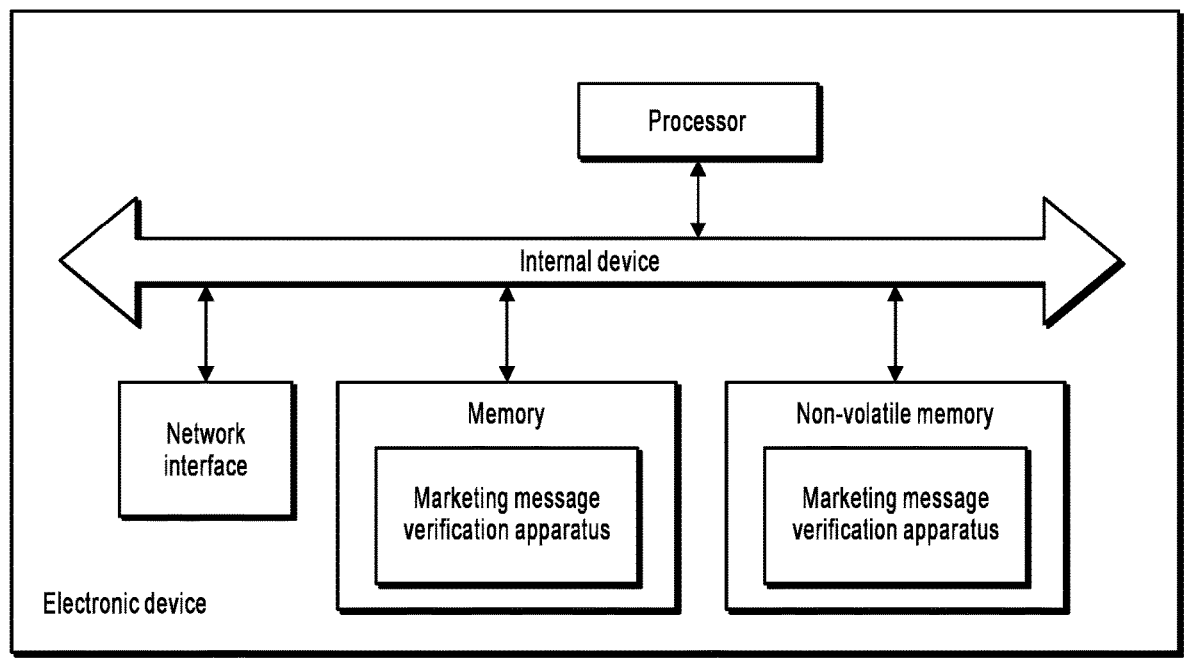
FIG. 12 is a schematic structural diagram illustrating still another electronic device, according to an embodiment of the present specification.

FIG. 12 is a schematic structural diagram illustrating an electronic device, according to an embodiment of the present specification. Referring to FIG. 12, in terms of hardware, the electronic device includes a processor, and optionally further includes an internal bus, a network interface, and a storage. The storage can include a memory, for example, a high-speed random access memory (RAM), and can further include a nonvolatile memory (nonvolatile memory), for example, at least one magnetic disk storage. Certainly, the electronic device can further include hardware needed by another service.

The processor, the network interface, and the storage can be connected to each other by using the internal bus. The internal bus can be an industry standard architecture (ISA) bus, a Peripheral Component Interconnect (PCI) bus, an extended industry standard architecture (EISA) bus, etc. The bus can be classified into an address bus, a data bus, a control bus, etc. For ease of indication, the bus is indicated by using only one double-headed arrow in FIG. 12. However, it does not mean that there is only one bus or only one type of bus.

The storage is configured to store a program. The program can include program code, and the program code includes a computer operation instruction. The storage can include a memory and a nonvolatile memory, and provide an instruction and data for the processor.

The processor reads a corresponding computer program from the non-volatile memory to the memory for running, and a signal broadcast device is logically formed. The processor executes the program stored in the storage, and is configured to perform the following operations: receiving an encrypted marketing message; and sending the merchant information and the marketing activity information corresponding to the merchant information that are in the encrypted marketing message to the terminal device if verification of the encrypted marketing message succeeds.

The sales promotion methods disclosed in the embodiments shown in FIG. 1 to FIG. 5 in the present specification can be applied to a processor, or implemented by a processor. The processor can be an integrated circuit chip and have a signal processing capability. In an implementation process, steps in the previous methods can be implemented by using a hardware integrated logical circuit in the processor, or by using instructions in a form of software. The processor can be a general purpose processor, including a central processing unit (CPU), a network processor (NP), etc., or can be a digital signal processor (DSP), an application-specific integrated circuit (ASIC), a field programmable gate array (FPGA) or another programmable logic device, a discrete gate or a transistor logic device, a discrete hardware component, etc. The processor can implement or perform the methods, the steps, and the logical block diagrams disclosed in one or more of the embodiments of the present application. The general purpose processor can be a microprocessor, or the processor can be any conventional processor. The steps of the methods disclosed in one or more of the embodiments of the present application can be directly performed by a hardware decoding processor, or performed by a combination of hardware and software modules in a decoding processor. The software module can be located in a mature storage medium in the field, such as a random access memory, a flash memory, a read-only memory, a programmable read-only memory, an electrically erasable programmable memory, or a register. The storage medium is located in the storage, and the processor reads information in the storage and completes the steps in the previous methods in combination with hardware in the processor.

The electronic device can further execute the sales promotion methods in FIG. 1 to FIG. 5, and details omitted here in the present specification for simplicity.

Certainly, in addition to software implementation, the electronic device in the present specification does not exclude another implementation, for example, a logic device or a combination of hardware and software. That is, an execution body of the following processing procedure is not limited to each logical unit, and can also be hardware or a logic device.

In conclusion, the previous descriptions are merely example embodiments of the present specification, and are not intended to limit the protection scope of the present specification. Any modifications, equivalent substitutions, and improvements made within the spirit and the principle of one or more of the embodiments of the present specification shall fall within the scope of one or more of the embodiments of the present specification.

The system, apparatus, module, or unit illustrated in the previous embodiments can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device. The computer storage medium can be used to store information accessible by the calculating device. Based on the definition in the present specification, the computer readable medium does not include transitory computer readable media (transitory media) such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a" does not preclude the existence of additional identical elements in the process, method, product or device that includes the element.

The embodiments in the present specification are described in a progressive way. For same or similar parts of the embodiments, references can be made to the embodiments. Each embodiment focuses on a difference from other embodiments. Particularly, a system embodiment is basically similar to a method embodiment, and therefore, is described briefly. For related parts, references can be made to related descriptions in the method embodiment.

What is claimed is:

1. A computer-implemented method comprising:
receiving, by a terminal device, an encrypted marketing message from a broadcast device, wherein the encrypted marketing message comprises merchant information and promotional information corresponding to the merchant information;
determining, by the terminal device, based on a category identifier and a broadcast device identifier in the encrypted marketing message, that the encrypted marketing message belongs to a predetermined category;
sending, by the terminal device, the encrypted marketing message to a server for verifying authenticity of the encrypted marketing message in response to determining that the category identifier is same as a category identifier of the predetermined category; and
receiving, by the terminal device, the merchant information and the promotional information from the server when the authenticity of the encrypted marketing message is verified, wherein the authenticity of the encrypted marketing message is verified by the server based on performing
receiving an advanced encryption standard (AES) key corresponding to the broadcast device identifier, and a first physical address corresponding to the broadcast device identifier comprised in the encrypted marketing message,
decrypting the encrypted marketing message based on the AES key to obtain a timestamp and a second physical address of the broadcast device broadcasting the encrypted marketing message, and
determining that the timestamp is within a predetermined time period and the first physical address and the second physical address are same.

2. The computer-implemented method according to claim 1, wherein the method further comprises:
waking up, by the terminal device, a corresponding application installed on the terminal device from a sleep mode; and
monitoring, by the terminal device, messages broadcast by the broadcast device.

3. The computer-implemented method according to claim 1, wherein the method further comprises:
sending, by the terminal device, a log indicating a first time point that a wakeup message is received by the terminal device and a second time point that the encrypted marketing message is received by the terminal device;
receiving, by the terminal device, a time interval update message to the terminal device based on a first number of times and a second number of times when (1) a ratio between the first number of times and a sum of the first number of times and the second number of times is less than or equal to a first predetermined threshold or when (2) a ratio between the second number of times and the sum of the first number of times and the second number of times is less than or equal to a second predetermined threshold, wherein the time interval update message comprises a frequency for broadcasting the wakeup message and a frequency for broadcasting the encrypted marketing message, wherein the first number of times and the second number of times are determined based on the first time point and the second time point, wherein the first number of times indicates a number of times the terminal device receives the wakeup message in a predetermined time period, and wherein the second number of times indicates a number of times the terminal device receives the encrypted marketing message in the predetermined time period.

4. The computer-implemented method according to claim 3, wherein the method further comprises:
in response to determining that a distance between the terminal device and the broadcast device is within a predetermined range, sending, by the terminal device, the time interval update message to the broadcast device.

5. The computer-implemented method according to claim 4, wherein the time interval update message is encrypted by using an AES key and is sent to the broadcast device based on a Bluetooth connection.

6. The computer-implemented method according to claim 5, wherein the method further comprises:
sending, by the terminal device, the time interval update message to the broadcast device for the broadcast device to update the time interval update message based on the AES key, and update the frequency for broadcasting the wakeup message and the frequency for broadcasting the encrypted marketing message based on the time interval update message.

7. The computer-implemented method according to claim 6, wherein the frequency for broadcasting the wakeup message and the frequency for broadcasting the encrypted marketing message are updated by the broadcast device when a device identifier of the terminal device matches a device identifier of the broadcast device.

8. A computer-implemented system, comprising one or more computers, and one or more computer memory devices interoperably coupled with the one or more computers and having tangible, non-transitory, machine-readable media storing one or more instructions that, when executed by the one or more computers, perform operations comprising:
receiving, by a terminal device, encrypted marketing message from a broadcast device, wherein the encrypted marketing message comprises merchant information and promotional information corresponding to the merchant information;
determining, by the terminal device, based on a category identifier and a broadcast device identifier in the encrypted marketing message, that the encrypted marketing message belongs to a predetermined category;
sending, by the terminal device, the encrypted marketing message to a server for verifying authenticity of the encrypted marketing message in response to determining that the category identifier is same as a category identifier of the predetermined category; and
receiving, by the terminal device, the merchant information and the promotional information from the server when the authenticity of the encrypted marketing message is verified, wherein the authenticity of the encrypted marketing message is verified by the server based on performing receiving an advanced encryption standard (AES) key corresponding to the broadcast device identifier, and a first physical address corresponding to the broadcast device identifier comprised in the encrypted marketing message,
decrypting the encrypted marketing message based on the AES key to obtain a timestamp and a second physical address of the broadcast device broadcasting the encrypted marketing message, and
determining that the timestamp is within a predetermined time period and the first physical address and the second physical address are same.

9. The computer-implemented system according to claim 8, the operations further comprising:
waking up, by the terminal device, a corresponding application installed on the terminal device from a sleep mode; and
monitoring, by the terminal device, messages broadcast by the broadcast device.

10. The computer-implemented system according to claim 8, the operations further comprising:
sending, by the terminal device, a log indicating a first time point that a wakeup message is received by the terminal device and a second time point that the encrypted marketing message is received by the terminal device;
receiving, by the terminal device, a time interval update message to the terminal device based on a first number of times and a second number of times when (1) a ratio between the first number of times and a sum of the first number of times and the second number of times is less than or equal to a first predetermined threshold or when (2) a ratio between the second number of times and the sum of the first number of times and the second number of times is less than or equal to a second predetermined threshold, wherein the time interval update message comprises a frequency for broadcasting the wakeup message and a frequency for broadcasting the encrypted marketing message, wherein the first number of times and the second number of times are determined based on the first time point and the second time point, wherein the first number of times indicates a number of times the terminal device receives the wakeup message in a predetermined time period, and wherein the second number of times indicates a number of times the terminal device receives the encrypted marketing message in the predetermined time period.

11. The computer-implemented system according to claim 10, the operations further comprising:
in response to determining that a distance between the terminal device and the broadcast device is within a predetermined range, sending, by the terminal device, the time interval update message to the broadcast device.

12. The computer-implemented system according to claim 11, wherein the time interval update message is encrypted by using an AES key and is sent to the broadcast device based on a Bluetooth connection.

13. The computer-implemented system according to claim 12, the operations further comprising:
sending, by the terminal device, the time interval update message to the broadcast device for the broadcast device to update the time interval update message based on the AES key, and update the frequency for broadcasting the wakeup message and the frequency for broadcasting the encrypted marketing message based on the time interval update message.

14. The computer-implemented system according to claim 13, wherein the frequency for broadcasting the wakeup message and the frequency for broadcasting the encrypted marketing message are updated by the broadcast device when a device identifier of the terminal device matches a device identifier of the broadcast device.

15. A non-transitory, computer-readable medium storing one or more instructions executable by a computer system to perform operations comprising:
   receiving, by a terminal device, encrypted marketing message from a broadcast device, wherein the encrypted marketing message comprises merchant information and promotional information corresponding to the merchant information;
   determining, by the terminal device, based on a category identifier and a broadcast device identifier in the encrypted marketing message, that the encrypted marketing message belongs to a predetermined category;
   sending, by the terminal device, the encrypted marketing message to a server for verifying authenticity of the encrypted marketing message in response to determining that the category identifier is same as a category identifier of the predetermined category; and
   receiving, by the terminal device, the merchant information and the promotional information from the server when the authenticity of the encrypted marketing message is verified, wherein the authenticity of the encrypted marketing message is verified by the server based on performing
      receiving an advanced encryption standard (AES) key corresponding to the broadcast device identifier, and a first physical address corresponding to the broadcast device identifier comprised in the encrypted marketing message,
      decrypting the encrypted marketing message based on the AES key to obtain a timestamp and a second physical address of the broadcast device broadcasting the encrypted marketing message, and
      determining that the timestamp is within a predetermined time period and the first physical address and the second physical address are same.

16. The non-transitory, computer-readable medium according to claim 15, the operations further comprising:
   waking up, by the terminal device, a corresponding application installed on the terminal device from a sleep mode; and
   monitoring, by the terminal device, messages broadcast by the broadcast device.

17. The non-transitory, computer-readable medium according to claim 15, the operations further comprising:
   sending, by the server device, a log indicating a first time point that a wakeup message is received by the terminal device and a second time point that the encrypted marketing message is received by the terminal device;
   receiving, by the terminal device, a time interval update message to the terminal device based on a first number of times and a second number of times when (1) a ratio between the first number of times and a sum of the first number of times and the second number of times is less than or equal to a first predetermined threshold or when (2) a ratio between the second number of times and the sum of the first number of times and the second number of times is less than or equal to a second predetermined threshold, wherein the time interval update message comprises a frequency for broadcasting the wakeup message and a frequency for broadcasting the encrypted marketing message, wherein the first number of times and the second number of times are determined based on the first time point and the second time point, wherein the first number of times indicates a number of times the terminal device receives the wakeup message in a predetermined time period, and wherein the second number of times indicates a number of times the terminal device receives the encrypted marketing message in the predetermined time period.

18. The non-transitory, computer-readable medium according to claim 17, the operations further comprising:
   in response to determining that a distance between the terminal device and the broadcast device is within a predetermined range, sending, by the terminal device, the time interval update message to the broadcast device.

19. The non-transitory, computer-readable medium according to claim 18, wherein the time interval update message is encrypted by using an AES key and is sent to the broadcast device based on a Bluetooth connection.

20. The non-transitory, computer-readable medium according to claim 19, the operations further comprising:
   sending, by the terminal device, the time interval update message to the broadcast device for the broadcast device to update the time interval update message based on the AES key, and update the frequency for broadcasting the wakeup message and the frequency for broadcasting the encrypted marketing message based on the time interval update message.

21. The non-transitory, computer-readable medium according to claim 20, wherein the frequency for broadcasting the wakeup message and the frequency for broadcasting the encrypted marketing message are updated by the broadcast device when a device identifier of the terminal device matches a device identifier of the broadcast device.

* * * * *

UNITED STATES PATENT AND TRADEMARK OFFICE
CERTIFICATE OF CORRECTION

PATENT NO. : 11,055,733 B2
APPLICATION NO. : 17/082538
DATED : July 6, 2021
INVENTOR(S) : Zhe Han and Lei Yang It is certified that error appears in the above-identified patent and that said Letters Patent is hereby corrected as shown below:

In the Claims

In Column 25, Line 51, Claim 17, delete "server" and insert -- terminal --, therefor.

Signed and Sealed this
Ninth Day of November, 2021

Drew Hirshfeld
*Performing the Functions and Duties of the
Under Secretary of Commerce for Intellectual Property and
Director of the United States Patent and Trademark Office*